United States Patent
Yumoto et al.

(10) Patent No.: US 6,734,910 B1
(45) Date of Patent: May 11, 2004

(54) ELECTRONIC CAMERA WITH FINDER IMAGE DISPLAY FUNCTION

(75) Inventors: Noboru Yumoto, Fussa (JP); Keiichi Kobayashi, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/384,005

(22) Filed: Aug. 26, 1999

(30) Foreign Application Priority Data

Aug. 31, 1998 (JP) .......................................... 10-260940

(51) Int. Cl.⁷ ........................ H04N 5/222; H04N 5/262
(52) U.S. Cl. ............. 348/333.12; 348/239; 348/333.05; 348/231.3
(58) Field of Search .................... 348/220.1, 222.1, 348/239, 333.01, 333.02, 333.05, 333.11, 333.12, 231.99, 231.2, 231.3, 231.6; 396/373, 374, 383; H04N 5/262, 5/222

(56) References Cited

U.S. PATENT DOCUMENTS

| | | | |
|---|---|---|---|
| 4,593,985 A | | 6/1986 | Minakuchi |
| 5,138,460 A | * | 8/1992 | Egawa .................. 348/333.12 |
| 5,710,954 A | * | 1/1998 | Inoue .................... 348/333.01 |
| 6,226,449 B1 | * | 5/2001 | Inoue et al. ............. 348/231.5 |
| 6,359,649 B1 | * | 3/2002 | Suzuki ..................... 348/220.1 |
| 6,515,704 B1 | * | 2/2003 | Sato ....................... 348/333.11 |

FOREIGN PATENT DOCUMENTS

| | | |
|---|---|---|
| EP | 0802688 A2 | 10/1997 |
| JP | 9-83849 | 3/1997 .......... H04N/5/225 |
| JP | 10-70697 | 3/1998 .......... H04N/5/765 |
| JP | 2753514 | 3/1998 |
| JP | 10-257370 | 9/1998 .......... H04N/5/225 |
| JP | 11-27613 | 1/1999 .......... H04N/5/765 |
| WO | WO 98/17059 A1 | 4/1998 |

OTHER PUBLICATIONS

Patent Abstracts of Japan, vol. 006, No. 151 (E–124), Aug. 11, 1982 and JP 57–073578 A (Sony Corp.), May 8, 1982, English Abstract Only*

* cited by examiner

Primary Examiner—Ngoc-Yen Vu
(74) Attorney, Agent, or Firm—Frishauf, Holtz, Goodman & Chick, P.C.

(57) ABSTRACT

In an ordinary shooting mode, when a user overlooks a shutter chance without conducting a shutter operation in a state in which a present through (finder) image is presented on a display section, or a user finds that the user has lost a shutter chance by confirming a shot still image or conducting another operation after operating a shutter button, if a prescribed operation (half pressing down of the shutter button or operation of a mode switching button) is conducted, a mode is switched to a through-image retrieving mode wherein, a through image displayed on the display section is replaced with past through images while being retrieved effective, and the user awaits a second shutter chance in a state in which a past through image is present on the display section and when the shutter button is operated, a past through image present at a time point of the operation of the shutter button is recorded for retention in a flash memory as a shot still image.

15 Claims, 10 Drawing Sheets

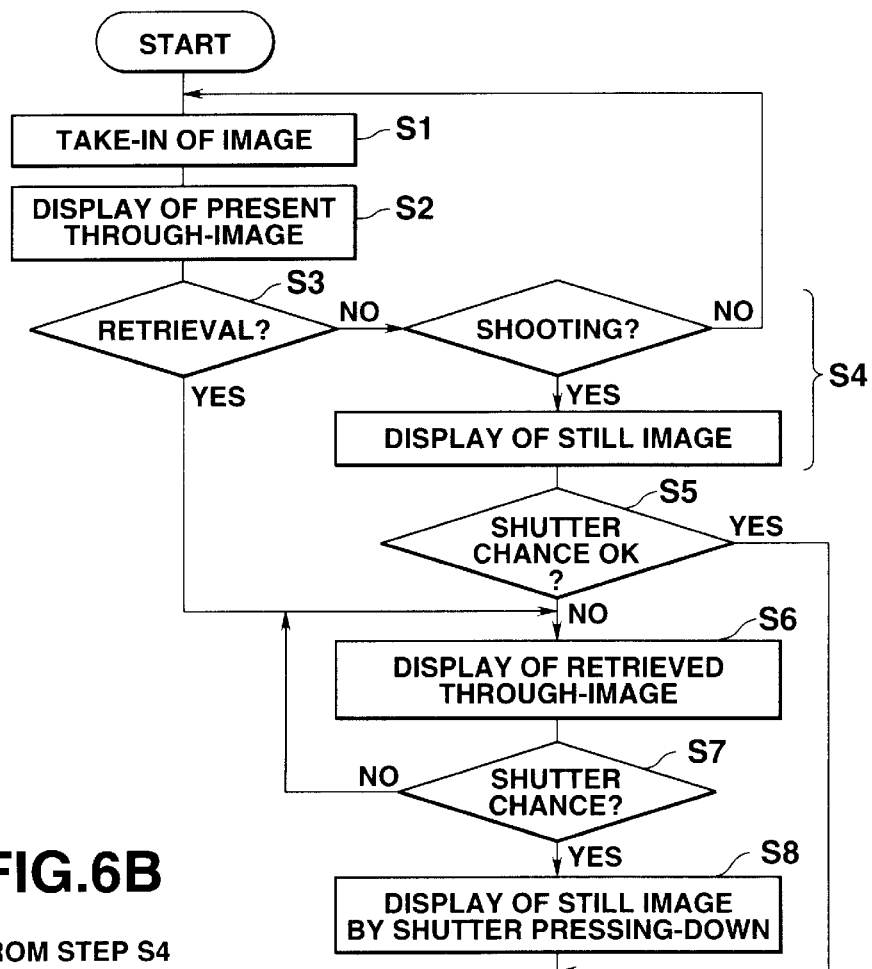
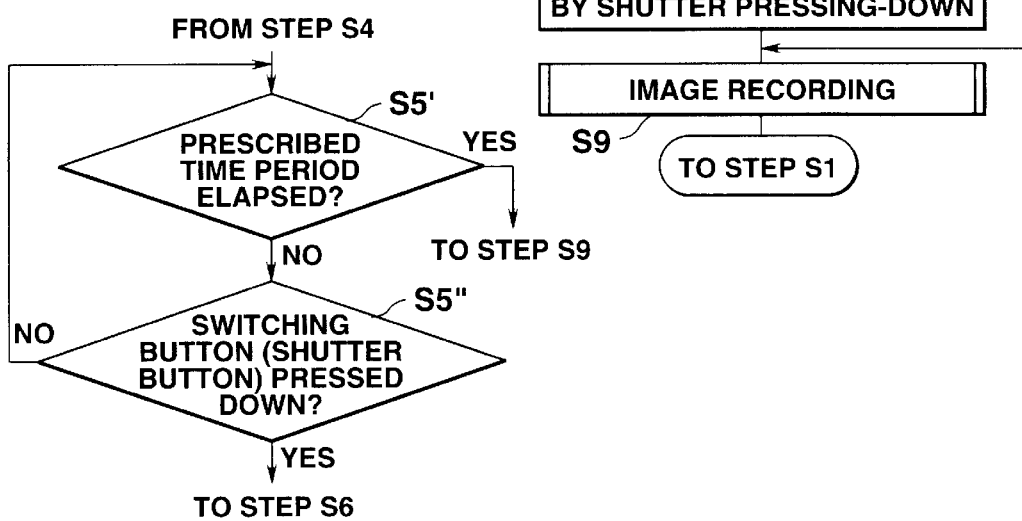

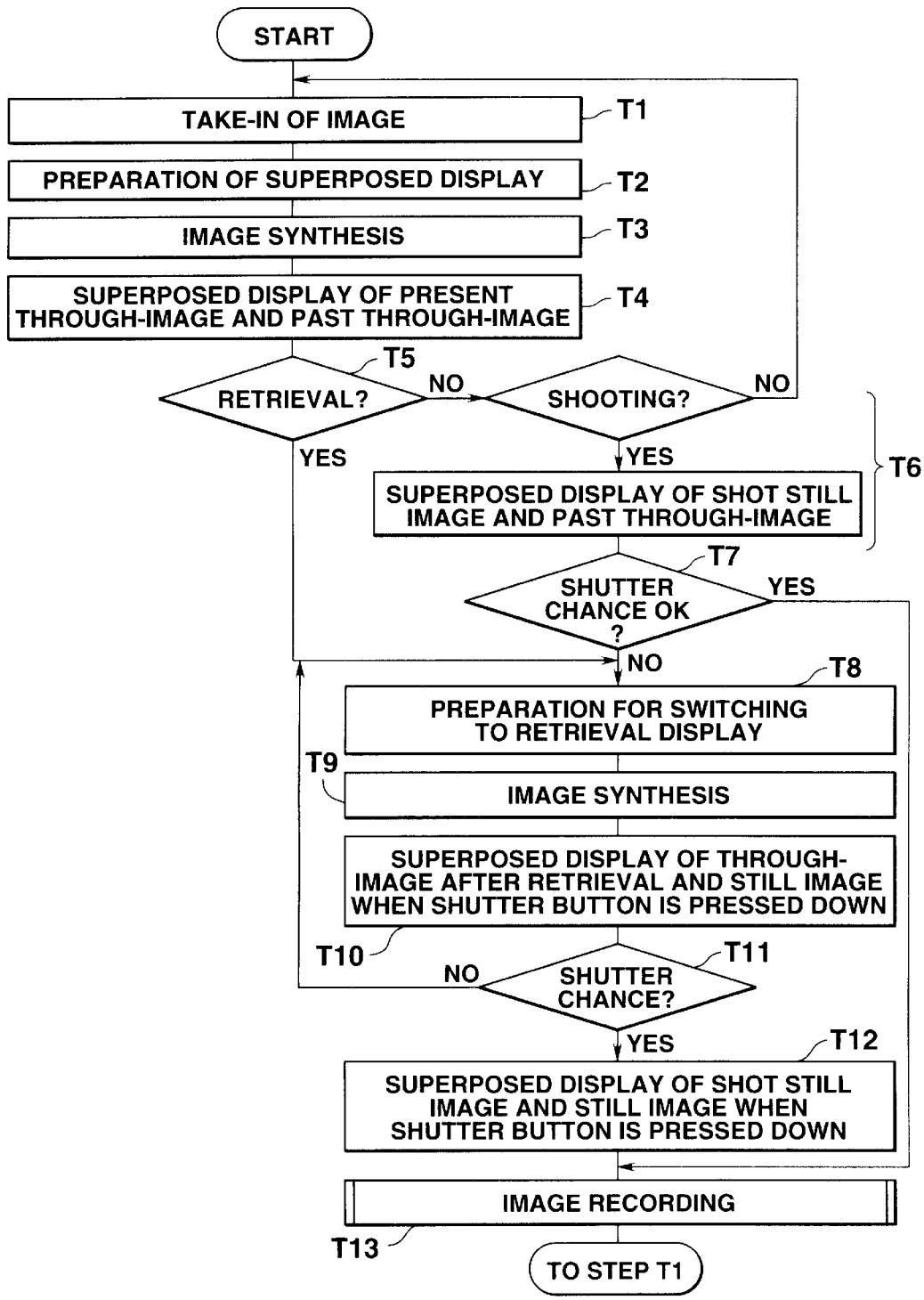

G8
(DESIRED START TIMING)

G13
(ACTUAL START TIMING)

G18
(RETRIEVED TIMING)

G23

ELECTRONIC CAMERA WITH FINDER IMAGE DISPLAY FUNCTION

BACKGROUND OF THE INVENTION

The present invention relates to an electronic camera and a control method for shooting with the same. Particularly, the present invention relates to an electronic camera which can display a finder image and a control method for shooting with the same.

In an electronic still camera (hereinafter referred to as a digital camera or the like), which is one kind of an electronic camera, when a shooting mode is set, an optical image of a subject is converted to an electric signal by an image pick-up element, image data obtained after image processing such as signal conversion and color process are not only taken in a working memory but simultaneously transferred to a display section and further the data transferred to the display section is subjected to image reconstruction by a video encoder, thereby displaying a through-(finder)-image (dynamic image) on a liquid crystal display.

Thereafter, if a user operates a shutter button in a desired timing (hereinafter referred to as a shutter chance), image data which has been taken in a working memory at a time point of the operation of a shutter button are not only presented on a liquid crystal display as a shot image in a still state, but also recorded in a retention-recording memory after the image data is compressed.

However, in such a process as described above, there are frequent cases for a user to overlook a shutter chance in a shoot mode without conducting a shutter operation and to find that the user has lost the shutter chances by confirming a shot still image after conducting a shutter operation.

As a result, there has been a problem that a user has cases where desired shot images cannot be obtained.

It is accordingly an object of the present invention to provide an electronic camera by which a shutter chance can be prevented from being lost and a control method for shooting with the same.

BRIEF SUMMARY OF THE INVENTION

In one of preferred embodiments in order to achieve the above described object, an electronic camera according to the present invention comprises:

image picking-up means for picking up an image of a subject;

display means for displaying the image picked up by the image picking-up means;

first display control means for controlling the display means so as to display the image picked up by the image picking-up means immediately after the image is picked up by the image picking-up means as a present finder image;

second display control means for controlling the display means so as to display the image picked up by the image picking-up means a prescribed time period after the image is picked up as a past finder image;

shoot instructing means for instructing shooting of the subject;

retention-image recording means for recording the image picked up by the image picking-up means as a retention-image; and record control means for controlling the retention-image recording means so as to record for retention, when shooting is instructed by the shoot instructing means, one of a present finder image and a past finder image according to a display state of the display means at a shoot instruction time point by the shoot instructing means as a shot image, whereby an electronic camera which can secure a shutter chance is provided.

In another of preferred embodiments in order to achieve the above-described object, an electronic camera according to the present invention comprises:

image picking-up means for sequentially picking up images of a subject;

display means for displaying the image picked up by the image picking-up means;

display control means for controlling the display mean so as to display the image picked up by the image picking-up means immediately after the image is picked up as a present finder image and simultaneously so as to display the image picked up by the image picking-up means a prescribe time period before a present time point as a past finder image;

first shoot instructing means for instructing shooting based on the present finder image;

second shoot instructing means for instructing shooting based on the past finder image;

retention-image recording means for recording for retention the image picked up by the image picking-up means;

first record control means for controlling the retention-image recording means so as to record for retention, when shooting is instructed by the first shoot instructing means, the present finder image of the present finder image and a past finder image presented on the display means at a shoot instruction time point by the first shoot instructing means as a shot image; and second record control means for controlling the retention-image recording means so as to record for retention, when shooting is instructed by the second shoot instructing means, the past finder image of a present finder image and the past finder image presented on the display means at a shoot instruction time point by the second shoot instructing means as a shot image, whereby an electronic camera which can secure a shutter chance is provided.

BRIEF DESCRIPTION OF THE SEVERAL VIEWS OF THE DRAWING

FIGS. 6A and 6B are flow charts showing operation examples of a control section in the first embodiment of the present invention.

FIG. 8 is a flow chart showing an operation example of a control section in the second embodiment of the present invention.

DETAILED DESCRIPTION OF THE INVENTION

Circuit Configuration

Figure 1:
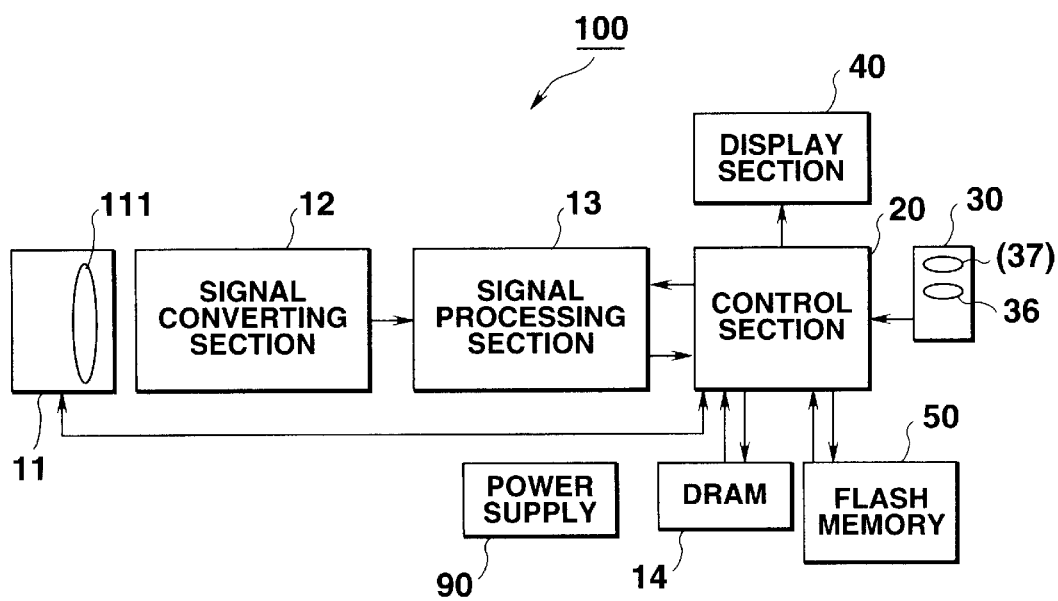
FIG. 1 is a block diagram showing a circuit configuration of a digital camera to which the present invention is applied.

FIG. 1 is a block diagram showing an embodiment of a circuit configuration of a digital camera (electronic still camera) to which a through-image (finder image) retrieving method of the present invention is applied.

As shown in FIG. 1, a digital camera 100 comprises: an optical system 11, a signal converting section 12; a signal processing section 13; a DRAM (Dynamic Random Access Memory) 14; a control section 20; an operator section 30; a display section 40; a flash memory 50; and a power supply 90.

The optical system 11 includes photographic lenses 111; an automatic diaphragm control mechanism (not shown) and the like, wherein light rays of a subject collected by way of the photographic lenses 111 are focused on an image pick-up element (CCD, i.e., Charge Coupled Device) at the later stage 12.

The signal converting section 12 includes the CCD, a signal converting circuit and the like, converts an image focused on the CCD through the optical system 11 into an electric signal, and outputs the converted electric signal into the form of digital data having a prescribed period.

The signal processing section 13 processes the output from the signal converting section 12 in an ordinary still-image shooting mode to obtain signal components including a luminance-color difference multiplex signal (Y, Cb, Cr data) in the digital form, and transfers the Y, Cb, Cr data (hereinafter referred to as image data) to the DRAM 14 so as to temporarily store it. In order to display a through image (a dynamic image and a finder image), image data which are taken in are sent to the display section 40 intermittently. It is alternatively allowed that image data which are sequentially stored into the DRAM 14 are read out and sent to the display section 40 to display through images.

The signal processing section 13 further reads out image data which are written in the DRAM 14 in recording for retention of an image by a shutter operation, applies the JPEG (Joint Photographic Expert Group) compression to image data. When regeneration of an image recorded for retention is conducted, the signal processing section 13 further applies data expansion to image data which are recorded for retention in a recording memory (flash memory) 50 to write resulted data into the DRAM 14.

Figure 4:
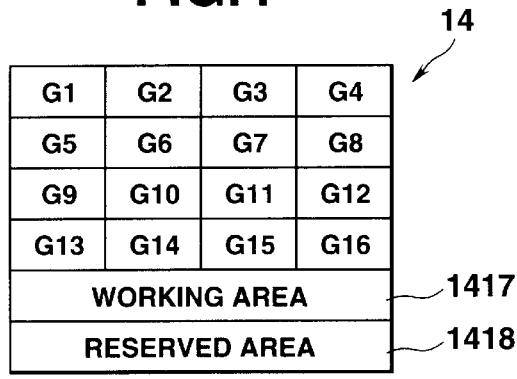
FIG. 4 is an illustration showing a layout in a working memory (DRAM) in an ordinary shooting mode.

The DRAM 14 is used as a working memory in an ordinary shooting mode, wherein image buffer areas Gi (i=1 to n) for a prescribed number of images are secured as buffers for through-image retrieval, as shown in FIG. 4. In a continuous image (dynamic image) mode, image buffer areas Gj (j=1 to m) more in number by a prescribed number than the number of images to be successively obtained are secured as well.

The control section 20 has a microprocessor architecture comprising CPU (Central Processing Unit); RAM (Random Access Memory); program storing ROM (Read Only Memory); a timer; and the like. The CPU is connected to the above-described circuits and a power supply switch not shown and the like by way of a bus line. The CPU controls the entire digital camera 100 based on control programs stored in the program storing ROM, and executes functions of the digital camera 100, for example, an ordinary shooting, regeneration of a recorded image, shooting by through-image retrieval in a through-image retrieving mode and the like on the basis of corresponding mode processing programs read out from the program storing ROM according to state signals from the operator section 30.

The operator section 30 comprises switches and buttons such as a processing mode change-over switch, a function selecting button, a power supply switch, a shutter button 36, a record regenerating mode selecting button, and the like. When the switches and buttons are operated, state signals are sent to the control section 20. In the mean time, the shutter button 36, in the embodiment, is provided with a function to switch to a through-image retrieving mode in one action when a shutter chance has been lost in shooting (FIG. 3). A through-image retrieving button 37 which is dedicated for selecting a through-image retrieving mode may separately be provided next to the shutter button 36.

The display section 40 comprises an video encoder, VRAM (Video RAM), LCD (Liquid Crystal display) and the like. Various images such as a through image in a shooting mode, a regenerative image in regenerating mode, a selection menu in a processing selecting mode, guides (or icons) are displayed on the LCD and, in addition, a past through-image in a through-image retrieving mode is displayed.

The flash memory 50 stores an image data from the signal processing section 13. Besides, in the flash memory 50, an area for recording the image data is secured and an image data register list information (not shown) is stored, in which, when image data are stored, information of a shooting mode, shooting conditions and the like of the image is registered. Incidentally, a memory card which is freely mountable/demountable to the camera body may be employed instead of the flash memory.

Shutter Chance Retrieving Mode

Figure 2A:
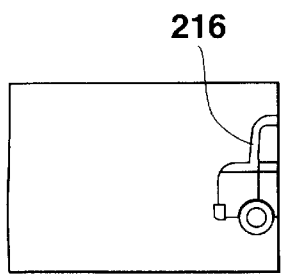
FIGS. 2A to 2C are display examples for illustrating a through-image retrieving mode of a first embodiment of the present invention.
Figure 2B:
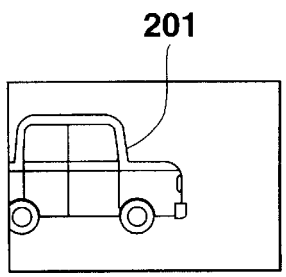
Figure 2C:
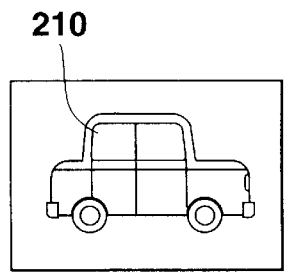

FIGS. 2A, 2B and 2C are schematic illustrations for a through-image retrieving method.

In the present embodiment, assume that a user has lost a shutter chance while the user cannot conduct a shutter operation, and that a user has conducted a shutter operation in a wrong timing, an image 216 (hereinafter referred to a present through-image) is displayed as shown in FIG. 2A.

In this state, when the user switches a shooting mode to a through-image retrieving mode by operating the shutter button 36 as described later (FIGS. 3A to 3F), through-images picked up in the past are sequentially displayed at prescribed intervals in a dynamic manner. The display of the through-images is started from a through image 201 (hereinafter referred to a past through-image) picked up at a time point in the past a prescribed time period earlier as shown FIG. 2B. Then, if a user conducts a shutter operation again at the shutter chance, an image 210 which has been picked up earlier can be obtained, as shown in FIG. 2C.

In this case, past through-images till several seconds prior to a time point when the shutter button 36 is wrongly operated are continuously displayed. In other words, the past through-image retrieving is not stopped at the time point when the shutter button 36 is wrongly operated but continued back to the past through-images for several seconds further from the image 216. With this function, a user can cope with when the user presses the shutter button 36 at an earlier time point than the shutter chance.

In the means time, past though-images may sequentially be displayed at prescribed intervals, while switching, starting an oldest image, till the present through-image 216 displayed at the time point when a user has wrongly pressed the shutter button 36.

According to the case of FIGS. 2A to 2C, when a user presses the shutter button 36 at a timing shown in FIG. 2A after a shutter chance, the shutter chance should be between the through-image 201 at a time point immediately before the switching to the through-image retrieving mode and a through image 216 at a time point when the user wrongly presses the shutter button 36. Therefore, the user can obtain a through image 210 at the shutter chance among past through images which are sequentially displayed.

Besides, a method of the present invention can make it possible to achieve a shoot start timing by retrieving past through-images, not only when a user overlooks a shutter timing or wrongly takes a shutter chance in a so-called ordinary shooting in a single shot operation mode (first embodiment) wherein images are picked up and recorded one frame at a time by shutter operations, but also when a user wrongly takes a start timing for shooting a continuous shooting (dynamic image shooting) with deviation in time, in which a plurality of images are continuously shot by a shoot start instruction (second embodiment).

In the mean time, while an interval to display through-images in the digital camera is set to 0.2 sec, a time length of retrieval of past through-images starting from a present through image is set to 3 sec, that is, a display time length for 16 through-images, the through-image display interval and the retrieval time period are not limited to the above described values, but may freely be determined in a proper manner in designing according to a performance and a type of a digital camera.

Mechanism of Shutter Button

Since a time period in which past through-images can be retrieved for display has a limit as described above, it is desirable that when a user finds that the user has lost a shutter chance or when a user feels that the user wrongly has taken a shutter chance, the user immediately switches a mode to a retrieving mode and correctly conducts a shutter operation again at a shutter chance after switching to past through-images.

For this reason, it is desirable that a shutter button and a switching button to a through-image retrieving mode are arranged adjacent to each other so that a switching operation is easy to be performed. In the embodiment, a shutter button 36 with which switching to the though-image retrieving mode can be performed in one action is used.

FIGS. 3A to 3F are illustrations of an operation of a shutter button which alone makes switching to a through-image retrieving mode possible.

In FIGS. 3A to 3F, when the shutter button 36 is pressed downward by a finger, it is moved downward and when a force by the finger is eliminated, the shutter button 36 is restored to its original position by a force upward with a spring or the like.

Figure 3A:
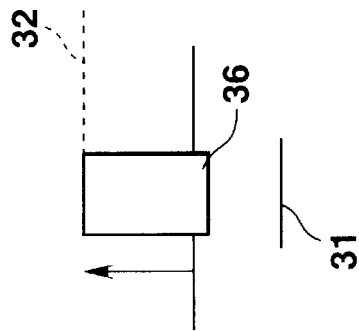
FIGS. 3A to 3F are illustrations of an operation for a setting method for the through-image retrieving mode in the present invention.

FIG. 3A shows a state of the shutter button 36 which is not pressed. Incidentally, a mark 31 indicates a contact position, a mark 32 indicates an original position to which the top of the shutter button 36 returns.

Figure 3B:
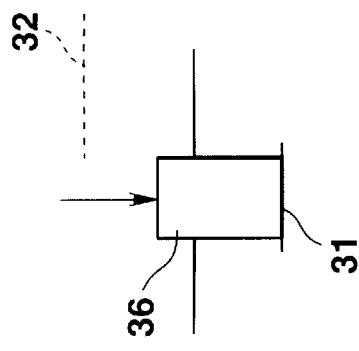

Further, FIG. 3B shows a state in which the shutter button 36 is forced downward by the finger or the like to reach the contact position 31, that is, where the shutter button 36 is fully pressed downward. With this state, the switch is on. When the switch is on, image data when the shutter operation is conducted (G13 of FIG. 5) is taken out from the DRAM 14 and is displayed on the display section 40 as a still image in order to confirm a shot image.

Figure 3C:
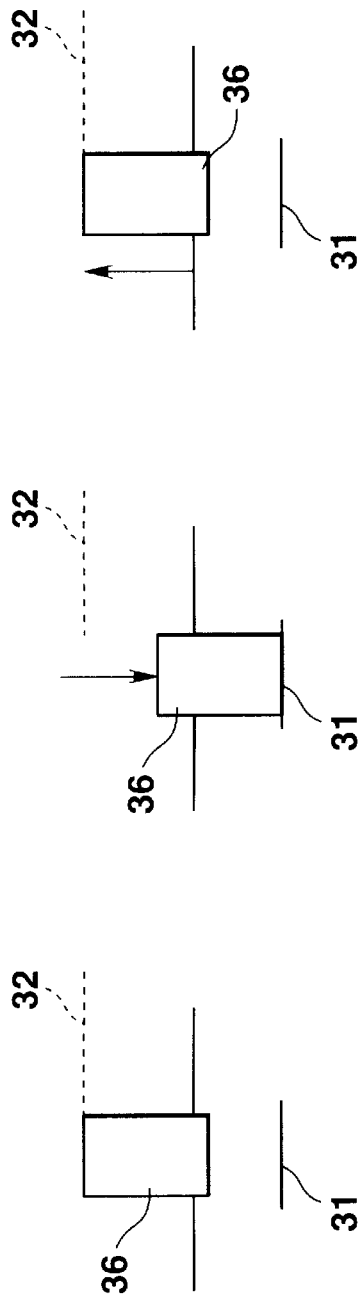

On this occasion, when the user releases his or her finger from the shutter button 36 as shown in FIG. 3C and sets the shutter button 36 free from a downward force, a record instructing signal is sent to the control section 20. Thereby, the control section 20 performs image record processing wherein image data in the DRAM 14 corresponding to a still image in display is compressed in the signal processing section 13 to be stored in the flash memory 50. In this embodiment, a present through-image (G13 of FIG. 5) is an image at the shutter chance.

On the other hand, when image data (G13 of FIG. 5) at a time point of a shutter operation is displayed as a still image on a screen of the display section 40, a user returns his or her finger upward a little to release the shutter button 36 from the contact position 31, but ceases his or her finger its upward motion on the way so as not to make the button fully restore its original position and keeps the shutter button 36 in the state (half pressed state) for a some time period. With the shutter button 36 in the half pressed state, a trigger signal is sent to the control section 20 to change a mode to a through-image retrieving mode, thereby displaying through-images (G1 to G16 of FIG. 5) while making the images in the past retrieved as shown in FIG. 2B.

In the mean time, when the shutter button 36 is pressed downward not to the contact position 31, but till half way before the contact position 31 and kept there, the shutter button 36 is also judged in a half pressed state.

Figure 3D:
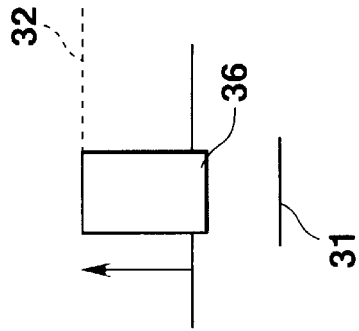
Figure 3E:
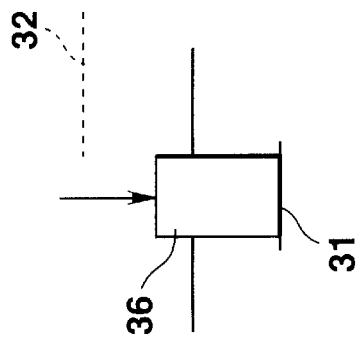

Further, when the shutter button 36 is again pressed downward by his or her finger to the contact position 31 as shown in FIG. 3E in a desired timing during display of past through-images in the through-image retrieving mode, the switch is turned on. Then, image data (G10 of FIG. 5) in the DRAM 14 at a time point of a second shutter operation is presented on a screen of the display section 40 as a still image.

Figure 3F:
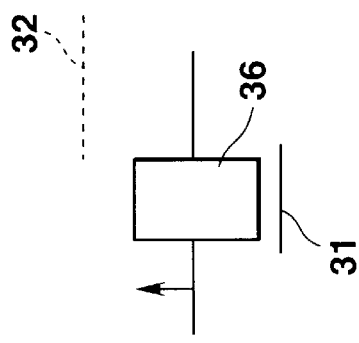

At this point, when the user releases his or her finger from the shutter button 36 to set a downward force free as shown in FIG. 3F, a record instructing signal is sent to the control section 20, image data in the DRAM 14 corresponding to a still image in display is compressed in the signal processing section 13. Thereafter, the data is stored in the flash memory 50.

First Embodiment

The embodiment is an example of retrieval of through-images in a so-called ordinary shooting mode in which images are picked up and recorded one at time by shutter operations and will be described based on FIGS. 1 to 5 and flow charts of FIGS. 6A and 6B.

Layout Example of RDAM 14

FIG. 4 is an illustration for a layout example of a DRAM 14 of a digital camera 100 and shows a layout in the ordinary shoot mode when an image of one frame in size is picked up.

Areas G1 to G16 which are secured in the DRAM 14 in FIG. 4 are storage areas for image data which are taken in at prescribed intervals. Further, an area indicated by a reference numeral 1417 is a working area and an area indicated by a reference numeral 1418 is a reserved area. In the mean time, in the embodiment, storage areas for image data are set to 16 areas G1 to G16 for the sake of convenience of description, but there is no limitation to this figure, but areas in number more or less than 16 areas may be adopted. That is, the number of storage areas which are required for a digital camera in designing in terms of a performance of a type thereof is only necessary.

The image of a subject which is located in the field of view of the digital camera 100 is converted to image data in the signal processing section 13 after being transmitted through the optical system 11 and the signal converting section 12 and then stored cyclically in Gi (i=1 to 16) of the DRAM 14 at prescribed intervals (in the embodiment, interval of 0.2 sec). After the storage areas G1 to G16 are fully stored, a storage operation is again performed in G1 and then G2 to G16 are further stored in the order and thereafter the same overwrite operation is repeated.

Relation between Present and Past Through Images

Figure 5:
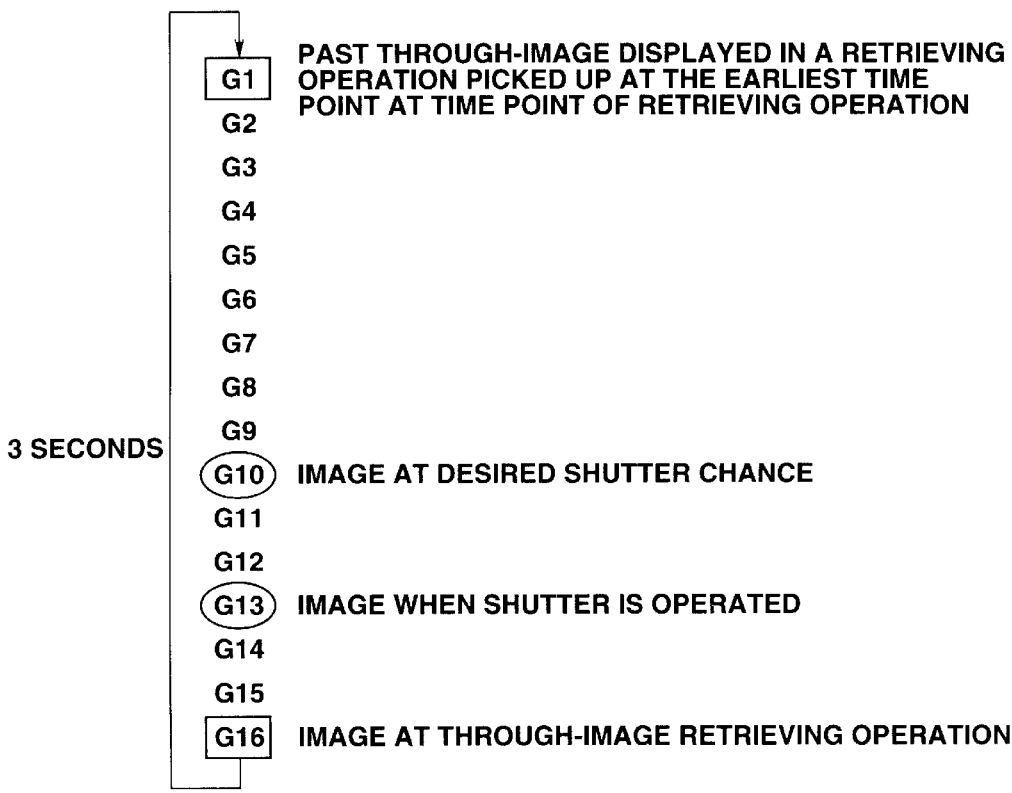
FIG. 5 is an illustration for a relation between image data which are cyclically stored in the working memory of FIG. 4 and through images.

FIG. 5 is an illustration for a relation between present and past through-images. In FIG. 5, G13 is an area where image data corresponding to a present through-image when the shutter operation is conducted are stored, G16 is an area where image data corresponding to a through-image obtained when a through-image retrieving operation is conducted are stored, and G1 is an area where image data corresponding to a past through-image picked up in the earliest time point in a through-image retrieving operation (in the embodiment, a through-image data 3 seconds before is stored) are stored. G10 is an area where image data at the desired shutter chance are stored.

While, in the embodiment, a present through-image is stored in an area G16 and a past through-image picked up at the earliest time point is stored in G1, it is also allowable that a series of operations are repeated in which when the most recent image is stored in the DRAM 14, all the images stored in the areas G1 to G16 are respectively shifted by one area to adjacent areas and thereby the earliest image data stored in G1 is erased, and the newest image is written in the empty G1.

Example of Through-Image Retrieval in Ordinary Shooting

FIG. 6A is a flow chart showing an operation example of the control section 20 including through-image retrieval in an ordinary shoot mode. Incidentally, in the embodiment, subject images are taken in at intervals of 0.2 second and a time of retrieval is set to 3 seconds.

Step 1: Take-in of Image

Now, when a user catches a car as a subject in the field of view of the digital camera 100 (FIGS. 2A and 2B), subject images are transmitted through the optical system 11 and the signal converting section 12, image data thereof are processed in the signal processing section 13 and the image data are finally stored sequentially in the area Gi (i=1 to 16) of the DRAM 14 at intervals of 0.2 second.

Step 2: Display of Through-Image

Unnecessary part of image data which are taken in at intervals of 0.2 second are removed in the signal processing section 13 and immediately thereafter displayed on a screen of the display section 40 as a real time image, that is, as a present through-image. In this case, since the through-images are sequentially displayed in very short intervals while switching, the display is of dynamic images. Accordingly, the user can await a shutter chance using a display screen as a finder.

Step S3: Operation When Shutter Chance is Overlooked

When the user finds that the user has lost a shutter chance without conducting a shutter operation while retaining a subject in the field of view, the user once stops the shutter button 36 on the way of pressing down without pressing down to the full extent to place the shutter button in a half pressed state. With the shutter button in the half pressed state, the digital camera comes into a through-image retrieving mode and program flow goes to S6.

Step S4: Shooting

Now, when a user presses down the shutter button 36 to the contact position 31 (FIGS. 3A to 3F) in a timing believing that the user grabs the shutter chance, the switch is on and image data at the shutter operation which are taken in the DRAM 14 are read out and displayed on the screen of the display section 40 as a still image (G13 of FIG. 5). Incidentally, the image which is already displayed on the display section 40 at the time point of the shutter operation may be kept displayed as it is as a still image. Program flow returns to Si while the user awaits the shutter chance. That is, subject images are taken in at intervals of 0.2 second and stored though-images are sequentially displayed till the shutter button 36 is pressed down.

Step S5: Confirmation of Shutter Chance and Shutter Operation

When it is confirmed that a still image, which is a shot image, displayed on the screen is of the desired shutter chance, the user releases his or her finger from the shutter button 36, so that the shutter button 36 is set free from a downward force, and the top of the shutter button 36 is restored to its original position. A record instructing signal is sent out to the control section 20 from the operator section 30 and program flow goes to S9.

Contrary to this, when the user feels that he or she has grabbed the shutter chance erroneously, the user releases the shutter button 36 on the way downward and stops its motion as shown in FIG. 3D, and the digital camera comes into a through-image retrieving mode and program flow goes to S6.

Step S6: Display of Retrieved Through-Image

When switching to a through-image retrieving mode is effected in the steps S3 or S5, past through-images (G1 to G16 of FIG. 5) in the past till 3 seconds before a present through-image obtained when switching to the through-image retrieving mode is effected are sequentially displayed starting from a past through-image picked up the earliest time point (G1 of FIG. 5). For example, when through-images are displayed while switching at intervals of 0.2 second which is same as the take-in interval of image data, past through-images picked up in the past till 3 seconds before a present time are always displayed.

Step S7: Second Shutter Operation

When the user sees past through-images and presses the shutter button 36 which is suspended at a half way position down to the contact position 31, a past through-image in display at the time point is shot and program goes to step S8. On the other hand, when the user does not conduct the shutter operation, program flow returns to step S6 and display of past through-images is continued. After the second shutter operation is effected, if the shutter button is again pressed down to the full extent and then part of a downward force is removed to place the shutter button in a half-pressed state, such a half-pressed state is not effective. In the mean time, when the second shutter operation is effected, image recording of step S9 may be started at a time when the shutter button is fully pressed while the user does not await till the shutter button 36 restores its original position 32.

Step S8: Display of Still Image

When the full-press shutter operation is conducted in the step S7, the control section 20 continues to display a past through-image which is displayed on the display section 40 at the time point of the shutter operation without any change as a still image. Thereafter program flow goes to step S9.

Step S9: Image Recording Process

When the user restores the shutter button 36 which is already pressed down to the contact position 31 in step S5 or S7 to its original position, the control section 20 regards a still image displayed in step S4 or S8 as at the shutter chance and sends image data in the DRAM 14 corresponding to the still image in display to the signal processing section 13 to compress the image data, and further makes the flash memory 50 store the data. Thereafter, program flow returns to step S1 and a present through-image display state is recovered.

By the above described operations, even if the shutter chance is overlooked or recognized in a wrong way, an image can be recorded finding out a desired shutter chance by retrieving past through-images each as effective.

In the mean time, while in the above described embodiment, the shutter button 36 can switch a mode to a through-image retrieving mode, it is also possible that a through-image retrieving mode switching button 37 is provided in the vicinity of the shutter button 36 and when the switching button 37 is operated, a trigger signal is sent out to the control section 20 and thereby, making the through-image retrieving mode effective, as a result of switching.

FIG. 6B is a flow chart showing an operation example of the control section 20 which is an alternative of step S5 of FIG. 6A, in a case where the retrieving mode switching button 37 is separately arranged.

First of all, in step S5', it is judged whether or not a prescribed time period has elapsed after a shooting instruction by an operation of the shutter button 36 in step S4 is issued.

Herein, if it is judged that the prescribed time period has not elapsed, then it is judged whether or not the retrieving mode switching button 37 has been operated (step S5").

Then, if it is judged that the retrieving mode switching button 37 has been operated, program flow goes to step S6 and a past through-image is displayed on the screen of the display section 40.

That is, when the retrieving mode switching button 37 is operated within the prescribed time period after shooting, in step S4 a shooting instruction is issued and image recording by step S9 of image data displayed as a still image is not conducted due to cancellation.

On the other hand, in step S5' if it is judged that the prescribed time length has elapsed, program flow goes to image recording of step S9, in step S4 a shooting instruction is issued and image recording of image data displayed as a still image is executed.

In the mean time, when processing of FIG. 6B is executed, in step S3 it is judged whether or not the retrieving mode switching button 37 is operated.

Further, alternative operations are allowed in which when a shooting instruction by the operation of the shutter button 36 in step S4 is issued and as a result, image recording (step S9) of image data at the time point when the instruction is issued is executed; and when the retrieving mode switching button 37 is operated within a prescribed time period after the issuance of the shooting instruction, image data which are recorded for retention in image recording are erased or the image data are designated as a recording (overwriting) position of image data picked up by the next shooting instruction.

Still further, alternative operations are allowed in which in step S4, when the shutter button 36 is pressed down and thereafter the shutter button 36 is again fully or half way pressed down within a prescribed time period (for example 1 second) while the through-image retrieving mode switching button 37 is not provided, as a result, a trigger signal is sent out to the control section 20 to switch a mode to the through-image retrieving mode.

While in FIGS. 6A and 6B, when a mode is switched to a through-image retrieving mode after shooting with a shutter operation, image recording of image data which is a shot image picked up by the shutter operation is not conducted, the data may be recorded for retention without prohibiting the image recording.

Further, while in the above embodiment, a display switch interval of past through-images is the same as an image take-in interval (image pick-up interval), that is, a display switch interval of present through-images, the display switch interval of past through-images may be set longer than that of the present through-images in order to prevent it from occurring to lose a second shutter chance.

Second Embodiment

The embodiment is an example of through-image retrieval in a so-called ordinary shooting mode in which images are picked up one at a time by shutter operations.

Figure 7A:
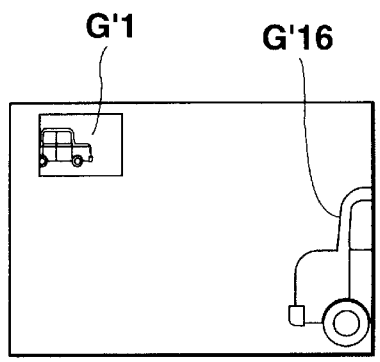
FIG. 7A and 7B are display examples for illustrating a through-image retrieving mode of a second embodiment of the present invention.
Figure 7B:
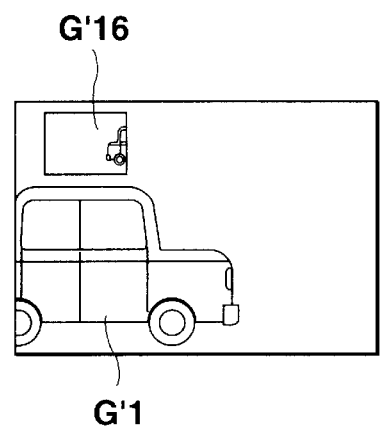

FIGS. 7A and 7B are illustrations showing an example of through-image display and through-image retrieving display.

While in the first embodiment, a through-image display is presented on one image on one screen basis as shown in FIGS. 2A–2C, in the second embodiment a down-sized past through-image is presented on part of a present through-image in a superimposing manner as shown in FIG. 7A when through-images are displayed. Further, when a mode is switched to the through-image retrieving mode, a down-sized present through-image is presented on part of past through-images sequentially presented while retrieving.

Below, a flow chart of FIG. 8 will be described based on FIGS. 1, 3 to 5 and 7A and 7B. FIG. 8 is a flow chart showing an operation example of the control section 20 in a case where down-sized another through-image occurring in time sequence is displayed on part of a through-image in the through-image retrieval in the ordinary shoot mode. Incidentally, a take-in interval of subject images is set to 0.2 second and a retrieval time is set to 3 seconds in the second embodiment in a similar manner to the first embodiment. Further, in the second embodiment, in order to simplify description thereof, a method for cyclically storing taken-in image data in the DRAM 14 is adopted, in which all images stored in the areas G1 to G16 are respectively shifted to adjacent areas each time when a new image data is written in and thereby, a present through-image is always stored in the area G16 and a past through-image picked up at the earliest time point is always stored in the area G1.

Step T1: Take-in of Image

Now, when a user catches a car as a subject in the field of view of the digital camera 100 (FIGS. 7A and 7B), subject images are transmitted through the optical system 11 and the signal converting section 12, image data thereof are processed in the signal processing section 13 and the image data are sequentially stored in the area G16 of the DRAM 14 at 0.2 second intervals. Incidentally, an image data stored in the area G16 immediately before new image data are taken in, the image data stored in the area G16 are shifted to the area G15 adjacent to the area G16.

Step T2: Preparation of Superimposed Display

Further, image data simultaneously taken in at intervals of 0.2 second are sequentially stored in the working area 1417 of the DRAM 14 after removing unnecessary part thereof in the signal processing section 13 as a present through-image updating the previous present through-image. That is, image data which are similar to image data which are sequentially stored in the area G16 are sequentially stored in the working area 1417 updating the previous image data.

Step T3: Synthesis of Images

Image data in the past 3 seconds before a present time are sequentially compressed and superimposed for synthesis on image data after removing unnecessary part thereof which are sequentially stored in the working area 1417 of the DRAM 14 in step T2 while updating the previous image data. That is, image data in the storage area G1 picked up at the earliest time point are compressed and superimposed for synthesis as a past through-image on image data after removing unnecessary part thereof, which are stored in the working area 1417 as a present through-image in the step T2, each time when image data are taken in to the storage area G16 for a present image.

Step T4: Display of Through-image as Synthetic Image

Then, synthetic image data stored in the working area 1417 of the DRAM 14 are sent to the display section 40 to display through-images on the screen at intervals of 0.2 second. In the example of FIG. 7A, a present through-image G'16 which is taken in is displayed in frame size and a past image G'1 at the earliest time point from a present though-image is displayed on the top left part of the present through-image G'16 as a past through-image in a superimposed and synthesized manner. In this case, through-images are sequentially displayed at very short intervals and therefore, the images are dynamically presented.

With such operations, a user can use a display image as a finder and can not only correctly await a shutter chance but also simultaneously see a past through-image.

Step T5: Operation When Shutter Chance is Overlooked

When the user finds that he or she has lost a shutter chance without conducting a shutter operation while retaining a subject in the field of view, the user stops the shutter button on the way of pressing down without pressing down to the full extent, but to place the shutter button in a half pressed state. With the shutter button in the half-pressed state, the digital camera comes in a through-image retrieving mode and program flow goes to step T8.

Step T6: Image Pick-up

Now, when a user presses downward the shutter button 36 to reach the contact position 31 at a shutter chance in timing, the switch is on. With the switch-on, update recording of image data to the working area 1417 in the DRAM 14 is suspended and image data in the working area are fixed, as they are when the shutter operation is conducted. With the fixation, a still image which is a shot image and a past through-image which are down-sized are displayed on the screen of the display section 40 with the past through-image superimposed on the still image.

On the other hand, when the shutter chance is awaited for a period of time, program flow returns to step T1. That is, subject images are taken in and present and past through images are sequentially displayed till the shutter button 36 is pressed down.

Step T7: Confirmation of Shutter Chance and Shutter Operation

When a still image displayed on the screen is of the desired shutter chance, a user releases his or her finger from the shutter button 36, a downward force imposed on the shutter button 36 is removed and the top of the shutter button 36 is restored to its original position. With the top of the shutter button 36 at its original position, a record instructing signal is sent out to the control section 20 from the operator section 30 and program flow goes to step T13.

On the other hand, when the shutter chance has been caught in a wrong timing, if a user presses the shutter button 36 and stops the button on the way downward, a mode is switched to the through-image retrieving mode and program goes to step T8. At this point, since the user can simultaneously see and confirm a past through-image displayed in the top left part on the screen in a superimposing manner, the user can judge whether or not he or she can catch the shutter chance in time with reference to a past through-image when a mode is switched to the through-image retrieving mode and can also judge whether or not switching to the retrieving mode can be necessary.

Step T8: Preparation for Switching to Retrieval Display

When transition from the step T5 or T7 to the step T8 is conducted, in order to effect switching to the retrieving mode, image data corresponding to a present through-image displayed at a time point when the shutter button 36 is pressed down half way in step T5 or a shot image displayed as a still image in step T6 are compressed to store in the working area 1417 of the DRAM 14.

Step T9: Synthesis of Images

Past image data in the past 3 seconds before a present time, that is, image data in the storage area G1 are sequentially processed to remove unnecessary part thereof and synthesized with compressed image data (still image data) stored in the working area 1417 of the DRAM 14.

That is, image data of a present through-image displayed at a time point when the shutter button 36 is pressed down half way in step T5 or when the shutter button 36 is fully pressed down in step T6 are compressed and the compressed image data are superimposed for synthesis on a past through-image in the past 3 seconds before the present through-image. Thereafter, in the same manner, still image data compressed and past image data which shift at 0.2 second intervals are synthesized with each other.

Step T10: Through-image Display after Shutter Chance Retrieval

Then, the synthesized image is sent to the display section 40 and a past through-image is displayed on the screen. In the example of FIG. 7B, G1' of an image of 3 seconds before is displayed in one frame size and a compressed image of a present through-image when the shutter button is pressed down is displayed on a past through-image in the top left part of the image G'1 in a superimposing manner (in a synthetic state).

In this case, since the past through-images are sequentially displayed at very short intervals, display is presented as a dynamic image. Accordingly, a user uses a display screen as a finder and can again await a shutter chance while referring to a present through-image displayed at a time point when a mode is switched to the retrieving mode, or a shot still image which is shot by a shutter operation, that is, an image for which a shutter chance has not been caught.

Step T11: Second Shutter Operation

When a user presses down the shutter button 36, which is located on the way to the contact position 31, in a desired timing (at a shutter chance) while the user watches past through-images, the switch is on with judgment that a shooting instruction is issued and program flow goes to step T12. On the other hand, when the user does not operate a full-press operation, program flow returns to step T8.

Step T12: Still Image Display

When a shooting instruction of a past through-image is issued in the step T11, the control section 20 takes out image data stored in the area G1 of the DRAM 14 at a time point when a shooting instruction is issued, that is, image data corresponding to a past through image displayed at a time point when the shutter button is pressed down, and sent out to the display section 40 to present a still image thereof on the screen of the display section 40. Thereafter, program flow goes to step T13. In the mean time, an image (a compressed image+a past through-image) displayed at a time point when the shutter button is again operated in step T11 can be continued to be displayed and the display may be regarded as a still image display.

Step T13: Image Recording

When a user restores the shutter button 36 which has been pressed down to the contact position 31 in step T7 or T11 to its original position, the control section 20 regards a still image displayed in one frame size in the step T6 or T10 as an image of a shutter chance and sends image data in the DRAM 14 corresponding to the still image to the signal processing section 13 to compress and store in the flash memory 50. Thereafter, program flow returns to step Ti and a display state presenting present and past through images is restored.

In the mean time, while in the above described embodiment, when a mode is changed to the through-image retrieving mode, a still image displayed as a present through-image at a time point when a mode is switched to the retrieving mode or a shot still image is displayed as a down-sized image together with a past through-image in step T10, only the past through-image may be displayed as in the first embodiment.

Further, in step T10, a present through-image may be displayed as a down-sized image together with a past through-image.

Further, in step T10, when program flow comes to the step from step T5, a present through-image may be displayed as a down-sized image together with a past through-image and when program flow comes to the step from step T7, a shot still image may be displayed as a down-sized image together with a past through-image. That is, an image which is displayed in one frame size before a mode is changed to the through-image retrieving mode may be displayed as a down-sized image and an image which is displayed as a down-sized image may be displayed as a one frame image.

While in step T12, a down-sized still image at a time point when the shutter button is pressed down (step T5 and T6) is displayed together with a shot still image which is given a shoot instruction in step T11, only the shot still image may be displayed or the shot still image and the present through image which is down sized may be displayed.

Figure 9A:
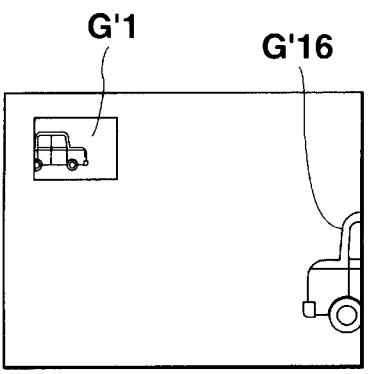
FIGS. 9A and 9B are display examples for illustrating a third embodiment of the present invention.
Figure 9B:
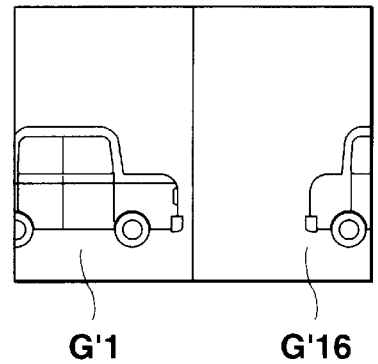

Further, while in the embodiment, as shown in FIGS. 7A and 7B, present and past through-images are respectively displayed in different image sizes, for example as shown in FIG. 9B, present and past through images may be displayed in the same size.

Third Embodiment

FIGS. 9A and 9B are examples showing a through-image display.

In the first and second embodiments, switching to the through-image retrieving mode is made possible and thereby, present and past through-images are displayed in a switching manner so that the present and past through-images can selectively be shot. Alternatively, the present and past through-images both may be always displayed and thereby the present and past through-images can selectively be shot with no switching to the through-image retrieving mode.

In this case, as in FIG. 9A, alternatively, the present through-image is displayed in one frame size and a down-sized past through image is displayed in a superimposing manner on the present through-image and, further alternatively as in FIG. 9B, the screen is halved into left and right halves and a ½-sized past through-image is displayed on the left half screen and a ½-sized present through-image is displayed on the right half screen. Incidentally, still further, alternatively, the screen is halved into upper and lower halves and the past and present through-images are respectively displayed on the half-sized screens.

Below, a flow chart of FIG. 10 will be described based on FIGS. 1, 3 to 5 and 9A and 9B.

Figure 10:
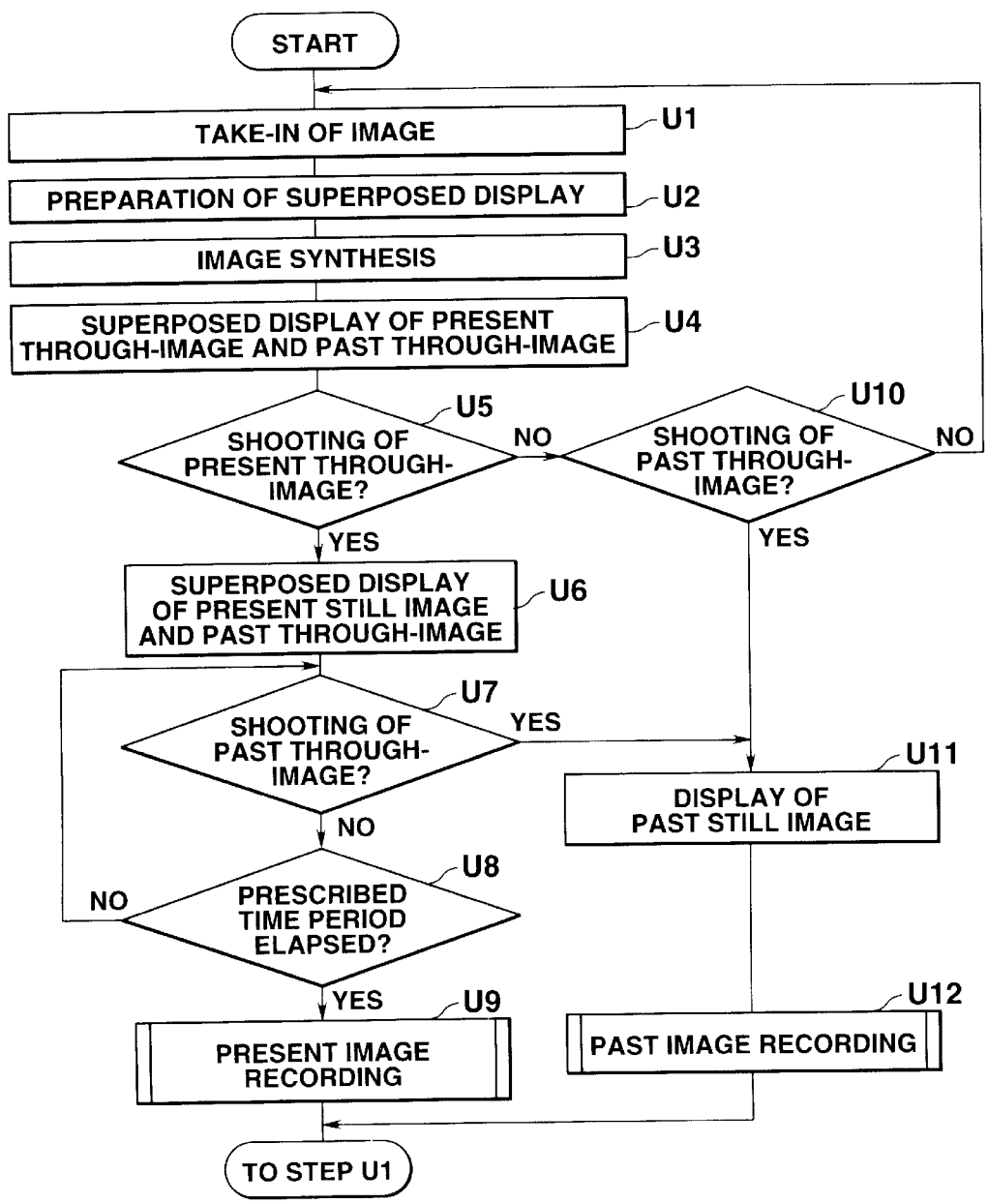
FIG. 10 is a flow chart showing an operation example of a control section in the third embodiment of the present invention.

FIG. 10 is a flow chart showing an operation example of the control section 20 in which past and present through-images are constantly simultaneously displayed in a through-image retrieval in an ordinary shooting mode and present and past images are selectively shot by adopting different shoot instructing methods. In the mean time, as in the first and second embodiments, a take-in time of subject images is set to 0.2 second and a retrieval interval is set to 3 seconds. Further, a method for cyclically storing image data in the DRAM 14 is similar to that of the second embodiment. In addition, the shutter button 36 is a shutter button for shooting a present through-image and the through-image retrieving mode-switching button 37 is a shutter (shooting instructing) button for shooting a past through-image.

Step U1: Take-in of Image

Now, when a user catches a car as a subject in the field of view of the digital camera 100 (FIGS. 9A and 9B), subject images are transmitted through the optical system 11 and the signal converting section 12, image data thereof are processed in the signal processing section 13 and the image data are sequentially stored in the area G16 of the DRAM 14 at 0.2 second intervals. Incidentally, image data stored in the areas G2 to G16 are respectively shifted to adjacent area G1 to G15 before new image data are stored in the area G16 and as a result, image data stored in the area G1 are erased.

Step U2: Preparation for Superimposed Display

Now, when a display is presented as in FIG. 9A, image data which are taken in at 0.2 second intervals are partly removed to eliminate unnecessary part and stored in the working area 1417 of the DRAM 14. For example, in FIG. 5, when image data are taken in the area G16 at 0.2 second intervals, the image data are partly removed to eliminate unnecessary part and sequentially stored in the working area 1417 as a present through-image while updating.

In the mean time, when a present through-image is displayed on a down-sized scale of ½ as in FIG. 9B, image data which are taken in at 0.2 second intervals are sequentially compressed in the signal processing section 13 to store in the working area 1417 of the DRAM 14. For example, in FIG. 5, when image data are taken in the area G16 at 0.2 second intervals, the image data are sequentially compressed in ½ size and sequentially stored in the working area 1417.

Step U3: Synthesis of Images

Further, image data in the past a prescribed time period before an image which is sequentially taken in the area G16 (in the embodiment, image data in the past 3 seconds before and stored in the area G1) are down-sized in a prescribed size and synthesized with image data (a present through-image), which are stored in the working area 1417 of the DRAM 14 in step U2, and which are partly removed to eliminate unnecessary part.

Step U4: Display of Through Image: Synthesized Image

Then, a synthesized image data are sent to the display section 40 and present and past through-images are displayed. In this case, since through-images are sequentially displayed at very short intervals, the images are dynamically presented. Accordingly, a user uses a display screen as a finder and can not only await a shutter chance but also simultaneously see a past through-image.

In the example of FIG. 9A, a present image G'16 is displayed in one frame size and a past image G'1 which is down-sized is displayed on the top left part thereof being superimposed on (or being synthesized with) the image G'16. Further, in the example of FIG. 9B, a past image G'1 which is down-sized in ½ size is displayed on the left half and a present image G'16 which is down sized in ½ size is displayed on the right half.

Step U5: Shooting of Present Through-image

When a user pressed down the shutter button 36 for present image shooting to the contact position 31 while catching a shutter chance by visually confirming a present through-image, a shooting instruction for a present through-image displayed at a time point when the shutter button is pressed down is issued and then program flow goes to step U6.

Step U6: Display of Present Still Image

In the step U5, when a shooting instruction for a present image is issued, the control section 20 takes out, as a shot still image, present image data taken in the area G16 of the DRAM 14 at a time point when the shoot instruction is issued; stored in the working area 1417; at the same time, sequentially compress a past through-image; synthesizes the compressed image with the shot still image data by performing a similar processing to that of step U3 and starts display of a synthetic image on the screen of the display section 40. Thereafter, program flow goes to step U7.

In the mean time, in the example of FIG. 9B, a shot still image is displayed on the right half screen and a past through-image is displayed on the left half screen.

That is, of present and past through-images displayed by processing in step U4, dynamic display of the present through-image is ceased to be presented and a still image thereof is displayed.

Step U7: Shooting of Past Through-image

When a user confirms a shot still image whose display gets started in step U6 and if the user judges that the image is not an image at a shutter chance, the user awaits a second shutter chance while watching past through-images which are simultaneously displayed and presses the shutter button 37 for a past shooting when the shutter chance comes. When the user presses the shutter button 37, a shooting instruction is issued for a past through-image which is displayed at the time point when the shutter button 37 is pressed down and program flow goes to step U11.

Step U8: Passage of Prescribed Time Period

It is judged whether or not a prescribed time period has elapsed after a shooting instruction is issued by an operation of the shutter button 36.

Herein, if it is judged that the prescribed time period has not elapsed, program flow returns to step U7 and when the prescribed time period has elapsed, program flow goes to step U9.

Step U9: Present Image Recording

In step U8, when it is judged that the prescribed time period has elapsed after the shutter button 36 is operated, the control section 20 sends a present image data which is taken out as a shot image in the step U6 while regarding a shot still image which is displayed as one picked up at a shutter chance to the signal processing section 13 to compress the image data, records the image data in the flash memory 50 and then, the processing is terminated. Thereafter, program flow returns to step U1 and a display state presenting present and past through-images is restored.

Step U10: Shooting of Past Through-image

When a user finds that a shutter chance has been overlooked without pressing down the shutter button 36 for present shooting while catching a subject in the field of view, the user awaits a second shutter chance while watching past through-images simultaneously displayed and when the second shutter chance comes, the user presses down the shutter button 37 for past shooting. With the pressing-down of the shutter button 37, a shooting instruction is issued for a past image displayed as a past through-image at the time point of the pressing-down of the shutter button 37 and program flow goes to step U9.

Step U11: Display of Past Still Image

In step U7 or U10, when a shooting instruction for a past through-image is issued, the control section 20 takes out, as a shot still image, past image data which are stored in the area G1 of the DRAM 14 at the time point when the shooting instruction is issued and sends the still image to the display section 40 to display the still image on the screen of the display section 40. Thereafter, program flow goes to step U12.

Step U12: Past Image Recording

In the step U10, the control section 20 sends past image data taken out in the step U11 as a shot image while regarding a shot still image which is displayed as one at a shutter chance to the signal processing section 13 to compress the image data and the image data are then stored in the flash memory 50. Thereafter the processing is terminated and then program flow returns to step U1.

In the mean time, while in the embodiment, the shutter button 36 for present shooting and the shutter button 37 for past shooting are separately provided, different methods for respectively operating one shutter button for present shooting and past shooting may be applied to the one shutter button (for example, in the case of present shooting, full pressing-down is applied while in the case of past shooting, half pressing-down is applied).

Further, while in the embodiment, in step U7, when the shutter button 37 for past shooting is operated, program flow goes to step U11, when the shutter button 36 which is the same as one for present shooting is twice operated within a prescribed time period after a shooting instruction is issued in step U5, program flow may go to step U11.

Further, alternative operations are allowed in which in step U5, when a shooting instruction is issued by an operation of the shutter button 36 for present shooting, image recording (step U9) of image data at a time point of the shooting instruction is executed and when the shutter button 37 for past shooting is operated within a prescribed time period after the shoot instruction, image data which is recorded for retention by image recording is erased, or the image data is set as a recording (overwrite) position for image data which are picked up in the next shoot instruction.

Further, while in the flow chart of FIG. 10, when the shutter button 37 for past shooting is operated within a prescribed time period after an shooting instruction by an operation of the shutter button 36 for present shooting, image recording of present image data is not performed, the processing of steps U7 and U8 is omitted and thereby, retention recording may be performed while no image recording is prohibited.

Further, in step U6, only a shot still image may be displayed without display of past through-image.

Further, in step U11, while only a shot still image is displayed, a present through-image may simultaneously be displayed.

For example, in the example of FIG. 9A, a down-sized present through-image is displayed on a still image display in a superposing manner and in the example of FIG. 9B, a shot still image is displayed on the left half screen and a present through-image is displayed on the right half screen.

Fourth Embodiment

Layout Example of DRAM 14

Figure 11:
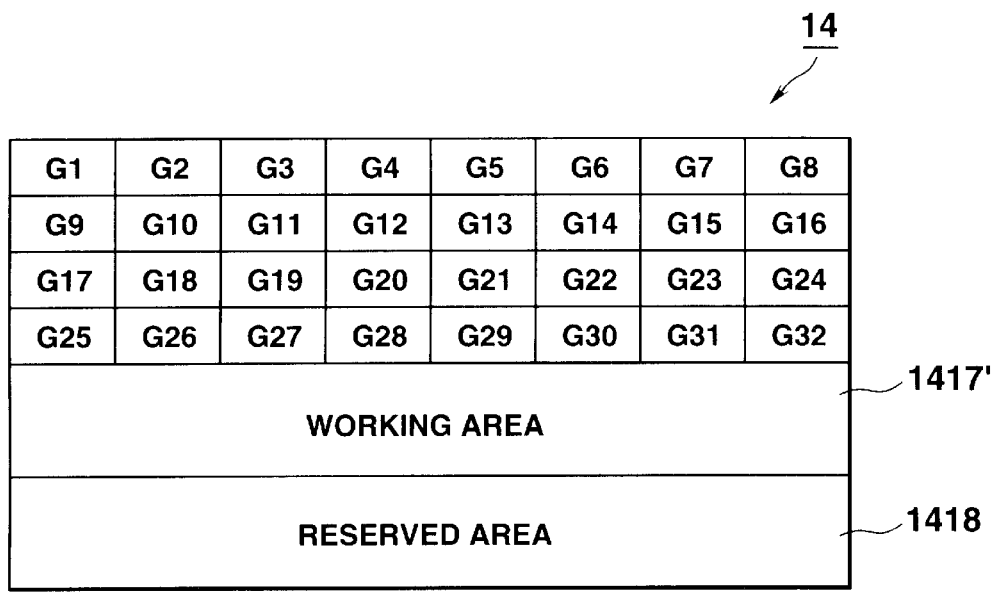
FIG. 11 is an illustration showing a layout in a working memory (DRAM) in a continuous (dynamic image) shooting mode.

FIG. 11 is an illustration showing an example of a layout of a working memory (DRAM 14) adopted in a case where the present invention is applied to a continuous (dynamic image) shooting mode, in which a plurality of images are continuously shot by a single shutter operation.

In FIG. 11, areas G1 to G32 secured on the DRAM 14 are storage areas for image data taken in at prescribed intervals. Further, an area indicated by a reference numeral 1417' is a working area and an area indicated by a reference numeral 1418' is a reserved area. Incidentally, while in the embodiment, storage areas for image data include the 32 areas G1 to G32, the number of storage areas is not limited to 32, but the number may be more or less than 32. That is, the number of storage areas may be the number required in designing in terms of a performance of a type of the digital camera.

Images of subject which a user catches in the field of view of the digital camera 100 are transmitted through the optical system 11 and the signal converting section 12 and the images are processed in the signal processing section 13 and the image data are cyclically stored at prescribed intervals in the image areas Gi (i=1 to 32) of the DRAM 14. That is, after the image data are stored in areas G1 to G32, program flow returns to the area G1 and then the areas G2 to G32 are sequentially stored in a write operation and thereafter such a write operation is further repeated.

Start Timing in Continuous Shooting Mode

Further, while in a continuous shooting mode, 16 images are continuously shot by a single operation of the shutter button 36 and the images are stored in the flash memory 50, when a user overlooks a shoot start timing without shutter operation, or when a shoot start timing is mistakenly recognized and conducts a wrong shutter operation, there is a chance in which the user loses the start timing for continuous shooting.

In such a case, since in the present invention, images are taken in 32 image areas at 0.2 second intervals (continuous shoot interval), even when a shoot start timing is left to pass by, through images in the past till 6.2 seconds before the wrong shutter operation can be displayed and thereby, a user can obtain continuously shot images picked up in a desired continuous start timing by a second shutter operation. Incidentally, while in the embodiment, a continuous shooting interval is set to 0.2 second, but an interval is not limited to this and may be shorter than 0.2 second. That is, a continuous shooting interval may be an interval required in designing in terms of a performance of a type of the digital camera.

Method for Retrieving Through-images

FIGS. 12A to 12D are illustrations for through-image retrieval in the continuous shooting mode.

While in the continuous shooting mode, 16 images are continuously shot at 0.2 second intervals by a single shutter operation, images of 32 frames are sequentially taken in the areas G1 to G32 of the DRAM 14 at 0.2 second intervals before the shutter operation is executed and present through-images are displayed.

Figure 12A:
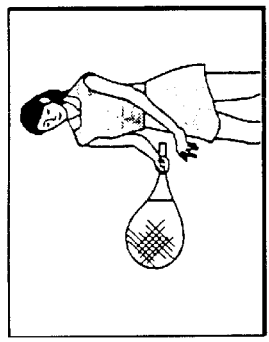
FIGS. 12A to 12D are illustrations for a relation between image data which are cyclically stored in the working memory of FIG. 11 and through images.
Figure 12B:
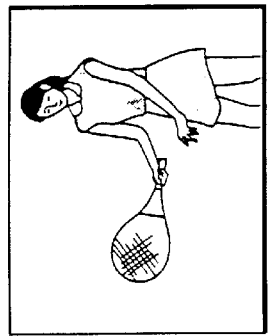
Figure 12C:
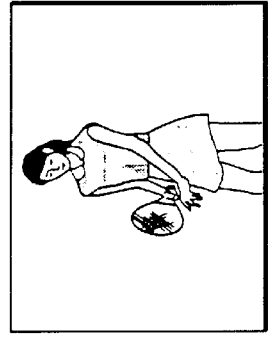
Figure 12D:
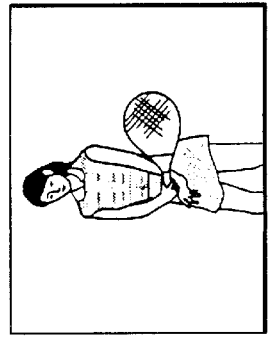

Now, it is assumed that a continuous shooting is conducted. While an image (area G8) of FIG. 12A is in a desired continuous shoot start timing, a user erroneously issues a continuous shoot start instruction (presses down the shutter button 36 to the contact position) in a timing in which an image (the image area G13) of FIG. 12B is taken in. When the user who has later found the instruction in the erroneous timing ceases cancellation of the shutter button 36 on the way as shown in FIG. 3D at a time point when an image (area G18) of FIG. 12C is displayed as a through-image, retrieval of through-images get started.

In this case, images in the past a prescribed time period (for example 6.2 seconds) before are displayed as past images in the form of a through-image.

When the user again presses the shutter button 36 to the contact position 31 and releases the button to its original position 32 as shown FIGS. 3E and 3F in a desired continuous shoot start timing (FIG. 12A; image of area G8), 16 images from G8 to G23 (FIG. 12D) are recorded in the flash memory 50 as continuously shot images.

In the mean time, while in the embodiment, the number of continuously shot images is set to 16 from the viewpoint of convenience in description, images in the number more or less than 16 may be employed. That is, the number of images in the continuous shooting mode may be the number required in designing in terms of a performance of a type of the digital camera 100. Further, while the number of images stored in the DRAM 14 is set to 32 for the sake of convenience in description, the number is not limited to this number either, but the number more or less than 32 may be set. That is, the number of images stored in the DRAM 14 may be more than the number of continuously shot images, or alternately may be less than that since images which are taken in after a retrieval timing can successively used.

Example of Retrieval Operation of Through-images in Continuous Shooting

Figure 13:
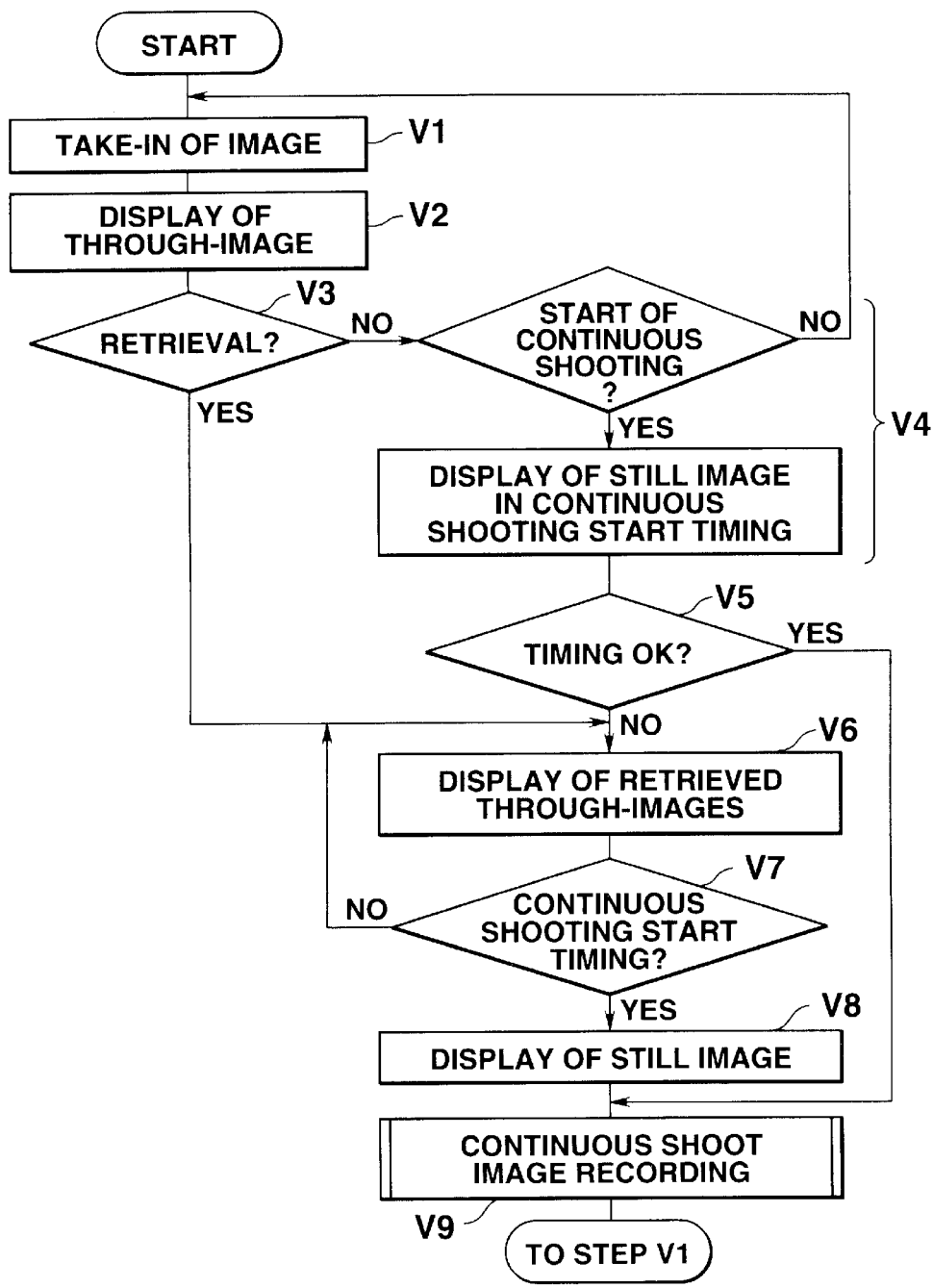
FIG. 13 is a flow chart showing an operation image of a control section in a fourth embodiment of the present invention.

FIG. 13 is a flow chart showing an operation example of the control section 20 including a through-image retrieval operation in the continuous shooting mode. Incidentally, in the embodiment, a take-in interval is set to 0.2 second and a retrieval time period is set to 6.2 seconds (corresponding to 31 images).

Step V1: Take-in of Image

Now, when a user catches a car as a subject in the field of view of the digital camera 100, subject images are transmitted through the optical system 11 and the signal converting section 12, image data thereof are processed in the signal processing section 13 and the image data are sequentially stored in the area Gj (j=1 to 32) of the DRAM 14 at 0.2 second intervals.

Step V2: Display of Through-image

Further, image data which are taken in at 0.2 second intervals are partly removed to eliminate unnecessary part and immediately displayed on the screen of the display section 40 as a present through-image. In this case, since through-images are sequentially displayed at very short intervals, the images are dynamically presented. Therefore, a user employs a display screen as a finder and can await a continuous shoot start timing.

Step V3: Operation in Overlooking of Continuous Shoot Start Timing

When a user finds that a continuous shoot start timing has been overlooked without conducting a shutter operation while retaining a subject in the field of view, if the user once stops the shutter button 36 on the way in a downward motion so as to place the shutter button 36 in a half pressed state without fully pressing down the shutter button 36, a mode is switched to the through-image retrieving mode and program flow goes to step V6.

Step V4: Continuous Shooting Start

Now, when the shutter button 36 is pressed down to the contact position 31 in a continuous shoo t start timing, the switch is on and the continuous shoot timing Dt (t=one of 1 to 32) is set. Incidentally, as shown in the figure, continuous shoot start image may be displayed on a screen of the display section 40 as a still image.

Further, while an operation of a continuous shoot start instruction is awaited, program flow returns to step V1 (that is, image data are taken in at 0.2 second intervals and through-images are sequentially displayed till the shutter button 36 is pressed down).

Step V5: Confirmation of Continuous Shoot Timing and Shutter Operation

When a user sees a still image in the continuous shoot start timing displayed on the display section 40 and releases his or her finger from the shutter button 36 with judgment that the shutter operation ha s been conducted in a desired timing (at desired shutter chance), and thereby the shutter button 36 is released from a downward force and the top of the shutter button 36 reaches its original position as shown FIG. 3F, then a continuous image record instructing signal is issued from the operator section 30 to the control section 20 and program flow goes to step V9.

On the other hand, when the user feels that the start timing has not been on time, releases the shutter button 36 from the downward force on the way to stops there, a mode is switched to the through-image retrieving mode and program flow goes to step V6.

Step V6: Display of Retrieved Through-images

In the step V3 or V5, when a mode is switched to the through-image retrieving mode, past through-images are sequentially displayed with an image in the past 6.2 sec before a present image at a time point of the mode switching as an image picked up at the earliest time point.

Step V7: Second Operation of Shutter

When a user presses down the shutter button 36 to the contact position 31, a past through-image displayed at the time point when the shutter button is pressed down is shot as a continuous shoot start image to set the time point as a continuous shoot timing Dt and thereafter, program flow goes to step V8. Further, when the user does not conduct the shutter operation, program flow returns to step V6 and a past through-image is displayed.

Step v8: Still Image Display

In step V7, when the shutter is operated in a fully pressed condition, the control section 20 takes out image data corresponding to a past through-image displayed at the time point of the shutter operation among image data taken in the DRAM 14 and sends the data to the display section 40 to display a still image thereof on the screen thereof. Thereafter, program flow goes to step V9.

Step V9: Image Recording

In the step V5 or V7, when a user restores the shutter button 36, which has been pressed down to the contact position 31, to its original position 32, the control section 20 sequentially sends image data of 16 image (till G23 in the example of FIG. 12D) starting from the area Gi (area G8 in the example of FIG. 12A) in a corresponding continuous shoot start timing Dt to the signal processing section 13 to compress the image data one image at a time and records the image data in the flash memory 50, in which operations till 16 images are repeated. When the operations are completed, the processing is terminated.

Then, program flow returns to step V1 and a display state of present and past through-images are restored.

With the above described operations, even when the user overlooks a continuous shoot start timing or recognizes the timing in a wrong way, retrieval is conducted back to a desired start timing and thereby, continuous images can be recorded.

In the mean time, while in the above described embodiment, the case where the present invention is applied to a digital camera with a continuous shooting mode is described, the present invention can also be applied to a video movie camera and the like which makes it possible to shoot dynamic images for a long time (for example 60 min).

Further, while in the above embodiment, a configuration and function of the embodiment which perform similar display to that in the first embodiment (FIG. 2A and FIG. 6A) are adopted, a configuration and function which perform similar display to that in the second embodiment (FIGS. 7 and 8) may be adopted.

That is, a shooting instruction of steps T6 and T11 in the flow chart of FIG. 8 may be a continuous shoot start instruction, displays of steps T6 and T10 may be a shot still image display +a past through-image display in a continuous shoot start timing or a through-image retrieving mode switching timing and image recording in step T13 may be continuous shoot image recording.

While in the above described embodiment, a mode is switched to a through-image retrieving mode as in the first and second embodiments, continuous shoot start instructing buttons for present shooting and past shooting may be provided as in the third embodiment (FIGS. 9A, 9B and 10) without provision of the through-image retrieving mode.

That is, a shoot instruction of steps U5, U7 and U10 in the flow chart of FIG. 10 may be a continuous shoot instruction and a shot still image display of steps U6 and U11 may be a shot still image display in a continuous shoot start timing and image recording in steps U9 and U12 may be continuous shoot image recording.

To sum up, while the embodiments of the preset invention are described, it is needless to say that the present invention is not limited to the above described embodiments, but a variety of modification and alterations thereof can be realized without departing from the scope of the present invention as hereinafter claimed.

What is claimed is:

1. An electronic camera comprising:
   image picking-up means for picking up an image of a subject being photographed;
   display means for displaying the image;
   first display control means for controlling the display means to display, as a current finder image, the image picked up by the image picking-up means, immediately after the picking-up operation;
   second display control means for controlling the display means so as to display, as a previous finder image, the image picked up by the image picking-up means, upon the passing of a predetermined time from the picking-up of the image;

display selection means for selecting as a finder image displaying state of the display means, one of a first finder image displaying state in which at least the current finder image is displayed by the display means in accordance with the control of the first display control means, and a second finder image displaying state in which at least the previous finder image is displayed by the display means in accordance with the control of the second display control means;

shoot instructing means for instructing the image pick-up means to perform shooting;

retention-image recording means for recording the image picked up by the image picking-up means as a retention-image;

first record control means for controlling the retention-image recording means to record for retention, when the image picking-up means is instructed by the shoot instructing means to perform shooting and the first finder image displaying state is selected by the display selection means, an image corresponding to the current finder image displayed by the display means at a shoot instruction time point, as a shot image; and second record control means for, controlling the retention-image recording means to record for retention an image corresponding to the previous finder image displayed by the display means at the shoot instruction time point, as a shot image, when the image picking-up means is instructed by the shoot instructing means to perform shooting and the second finder image displaying state is selected by the display selection means.

2. An electronic camera according to claim 1, further comprising selection instructing means for instructing the display selection means to select one of the first and second finder image displaying states.

3. An electronic camera according to claim 2, wherein the selection instructing means instructs the display selection means to select one of the first and second finder image displaying states by using a switching member.

4. An electronic camera according to claim 1, wherein the display selection means selects one of the current finder image which is displayed by the display means in accordance with the control of the first display control means and the previous finder image which is displayed by the display means in accordance with the control of the second display control means as a finder image to be displayed by the display means, wherein when the image picking-up means is instructed by the shoot instructing means to perform shooting and the current finder image is selected by the display selection means, the first record control means controls the retention image recording means to record for retention the image corresponding to the current finder image displayed by the display means at the shoot instruction time point as the shot image; and wherein when the image picking-up means is instructed by the shoot instructing means to perform shooting and the previous finder image is selected by the display selection means, the second record control means controls the retention-image recording means to record for retention the image corresponding to the previous finder image displayed by the display means at the shoot instruction time as the shot image.

5. An electronic camera according to claim 1, wherein the display selection means selects, as another finder image displaying state of the display means, one of the first and second finder image displaying states and in the first image displaying state, the current finder image is displayed in a first display area of the display means, and the previous finder image is displayed in a second display area of the display means in accordance with the control of the second display control means, and in the second image displaying state, the present finder image is displayed in the second display area of the display means in accordance with the control of the first display control means and the past finder image is displayed in the first display area of the display means in accordance with the control of the second display control means, wherein when the image pick-up means is instructed by the shoot instructing means to perform shooting, and the first finder image displaying state is selected by the display selection means, the first record control means controls the retention image recording means so as to record for retention the image corresponding to the current finder image displayed in the first display area of the display means at the shoot instruction time as the shot image, and wherein when the image picking-up means is instructed by the shoot instructing means to perform shooting, and the second finder image displaying state is selected by the display selection means, the second recording control means controls the retention-image recording means so as to record for retention the image corresponding to the previous finder image displayed in the first display area of the display means at the shoot instruction time, as the shot image.

6. An electronic camera according to claim 1, further comprising retention-record prohibiting means for canceling recording for retention of the image corresponding to the present finder image in the retention-image recording means controlled by the first record control means.

7. An electronic camera according to claim 6, which further comprises selection instructing means for instructing the display selection means to select one of the first and second finder displaying states, and wherein the retention-record prohibiting means cancels the recording for retention of the image corresponding to the current finder image, when the selection instructing means instructs the display selection means to select the second finder image display state.

8. An electronic camera according to claim 1, wherein the shoot instructing means instructs the image picking-up means to start continuous shooting or dynamic image shooting, wherein when the image picking-up means is instructed by the shoot instructing means to start the continuous shooting or dynamic image shooting, the first record control means controls the retention-image recording means to record for retention the image corresponding to the current finder image as a shooting start image of continuous shooting or dynamic image shooting, and wherein when the image picking-up means is instructed by the shoot instructing means to start the continuous shooting or dynamic image shooting, the second record control means controls the retention-image recording means to record for retention the image corresponding to the previous finder image as the shooting start image of continuous shooting or dynamic image shooting.

9. An electronic camera according to claim 1, further comprising temporary image storing means for sequentially cyclically scoring a plurality of images picked up by the image picking-up means, and wherein the second display control means controls the display means to display previous finder images by sequentially reading out images stored in the temporary image storing means.

10. An electronic camera comprising:

image picking-up means for sequentially picking up images of a subject being photographed;

display means for displaying an image;

display control means for controlling the display mean to display, as a current finder image, an image picked up by the image picking-up means, immediately after the picking-up of the image and to display, as a previous finder image, an image packed up by the image picking-up means a predetermined time ago;

first shoot instructing means for instructing the image picking-up means to perform shooting based on a current finder image;

second shoot instructing means for instructing the image picking-up means to perform shooting based on a previous finder image;

retention-image recording means for recording for retention an image picked up by the image picking-up means;

first record control means for controlling the retention-image recording means so as to record for retention, when the image picking-up means is instructed by the first shoot instructing means to perform shooting, an image corresponding to a current finder image of current and previous finder images presented on the display means at a shoot instruction time points, as a shot image; and second record control means for controlling the retention-image recording means so as to record for retention, when the image picking-up means is instructed by the second shoot instructing means to perform shooting, an image corresponding to a past finder image of current and previous finder images presented on the display means at the shoot instruction time as a shot image.

11. An electronic camera according to claim 10, further comprising temporary image storing means for sequentially cyclically storing a plurality of images picked up by the image picking-up means, and wherein the display control means controls the display means so as to display previous finder images by sequentially reading out images stored in the temporary image storing means.

12. An electronic camera according to claim 10, further comprising retention-record prohibiting means for canceling recording for retention of a shot image based on a current finder image in the retention-image recording means controlled by the first record control means.

13. An electronic camera according to claim 12, wherein the retention-record prohibiting means cancels the recording for retention of the image corresponding to the current finder image, when the image picking-up means is instructed by the second shoot instructing means to perform shooting.

14. A method for controlling an electronic camera comprising the steps of:

picking up an image of a subject being photographed;

selecting as a finder image displaying state, one of a first finder image displaying state in which the image is displayed to include a current finder image by a display section immediately after the image is picked up, and a second finder image displaying state in which the image is displayed to include a past finder image by the display section after a predetermined time period lapses after the image is picked up;

controlling a retention-image recording section to record for retention, when an instruction for performing shooting is given and the first finder image displaying state is selected, an image corresponding to a present finder image displayed by the display section at a shoot instruction time point at which the instruction is given as a shot image; and controlling the retention image recording section to record for retention, when the instruction for performing shooting is given and the second finder image displaying state is selected, an image corresponding to a previous finder image displayed by the display section at the shoot instruction time as a shot image.

15. A method for controlling an electronic camera comprising the steps of:

picking up an image of a subject being photographed;

controlling a display section to display, as a current finder image, a picked-up image immediately after the picking-up of the image and to display, as a previous finder image, an image picked up a predetermined time ago;

controlling an image record section to record for retention, when an instruction for performing shooting based on a current finder image is given, an image corresponding to the current finder image of the current finder image and a previous finder image presented on the display section, at a shoot instruction time at which the instruction for performing the shooting based on the current finder image is given, as a shot image; and controlling the image record section to record for retention, when the instruction for performing shooting based on a previous finder image is given, an image corresponding to the previous finder image of a current finder image and the previous finder image presented on the display sections, at a shoot instruction time at which the instruction for performing the shooting based on the previous finder image is given, as a shot image.

* * * * *